United States Patent [19] [11] 3,679,778
Nachbur et al. [45] July 25, 1972

[54] AMIDE AND CARBAMATE DIPHOSPHONATES AND PROCESS FOR THEIR MANUFACTURE

[72] Inventors: Hermann Nachbur, Dornach; Arthur Maeder, Therwil, both of Switzerland

[73] Assignee: Ciba-Geigy AG, Basel, Switzerland

[22] Filed: Dec. 16, 1969

[21] Appl. No.: 885,645

[30] Foreign Application Priority Data

Dec. 24, 1968 Switzerland ..................... 19236/68

[52] U.S. Cl. .................... 260/932, 260/938, 260/968, 117/136
[51] Int. Cl. ......................... C07f 9/38, D06c 27/00
[58] Field of Search ........................... 260/932, 968

[56] References Cited

UNITED STATES PATENTS 3,351,617   11/1967   Jaeger et al. ..................... 260/932 X

*Primary Examiner*—Lewis Gotis
*Assistant Examiner*—Anton H. Sutto
*Attorney*—Harry Goldsmith, Joseph G. Kolodny and Mario A. Monaco

[57] ABSTRACT

Phosphorus compounds are provided which correspond to the formula

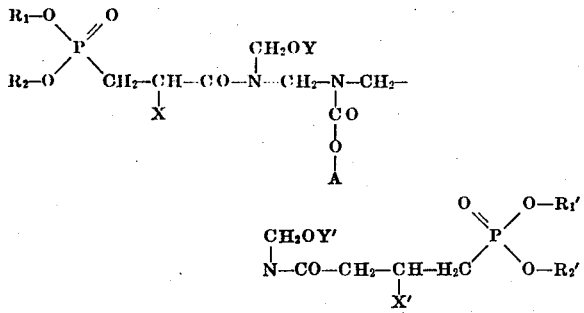

wherein each R is an alkyl, alkenyl or halogenalkyl radical, X and X' each is a methyl radical or a hydrogen atom, Y and Y' each is an alkyl radical or a hydrogen atom and A is an alkyl, halogenalkyl, hydroxyalkyl or a phenyl or benzyl group which both may be halogen substituted. The phosphorus compounds are manufactured from the corresponding phosphorus carboxylic acid amides and carbamates and formaldehyde. These compounds optionally together with a curable aminoplast precondensate are useful for flameproofing and creaseproofing of cellulose-containing fiber materials.

11 Claims, No Drawings

AMIDE AND CARBAMATE DIPHOSPHONATES AND PROCESS FOR THEIR MANUFACTURE

The subject of the invention are phosphorus compounds of formula (1)
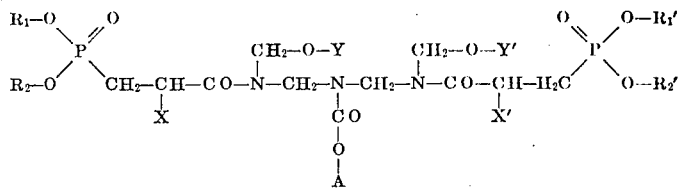

wherein $R_1$, $R_2$, $R_1'$ and $R_2'$ each denote an alkyl, alkenyl or halogenalkyl residue with at most 4 carbon atoms, X and X' each represent a methyl residue or preferably a hydrogen atom, Y and y' each represent an alkyl residue with at most four carbon atoms or a hydrogen atom and A represents an alkyl residue with one to 22 carbon atoms, a halogenalkyl residue with at most four carbon atoms, a hydroxyalkyl residue with at most four carbon atoms, an alkenyl residue with two to 22 carbon atoms or a phenyl or benzyl group which both may be halogen substituted.

Particularly advantageous phosphorus compounds correspond to the formula (2)
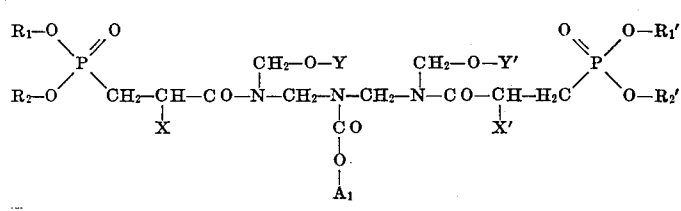

wherein $A_1$ represents an alkyl residue with one to 22 carbon atoms, a halogenalkyl residue with at most four carbon atoms, an alkenyl residue with two to 22 carbon atoms or a phenyl or benzyl group which both may be halogen substituted and $R_1$, $R_2$, $R_1'$, $R_2'$, X, X', Y and Y' have the indicated significance.

Symmetrical phosphorus compounds of formula (3)
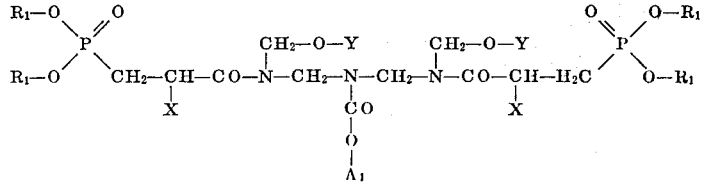

wherein $R_1$, X, Y and $A_1$ have the indicated significance, are preferred.

Phosphorus compounds of formula (4)
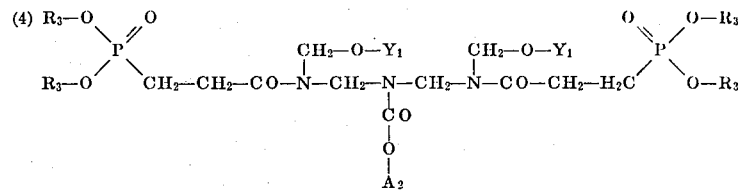

wherein $R_3$ represents an ethyl residue or especially a methyl residue, $Y_1$ represents a methyl residue or preferably a hydrogen atom and $A_2$ represents an alkyl residue with one to 18 carbon atoms, a halogenalkyl residue with at most 3 carbon atoms, a hydroxyalkyl residue with at most three carbon atoms or an alkenyl residue with two to four carbon atoms are of particular interest.

At the same time phosphorus compounds of formula (5)
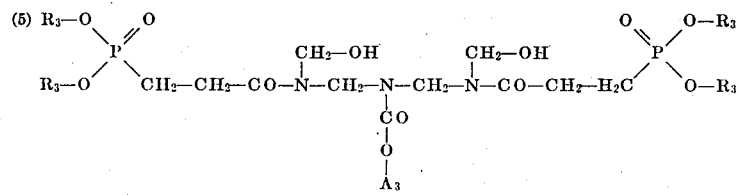

wherein $R_3$ represents an ethyl residue or especially a methyl residue and $A_3$ represents an alkyl residue with one to four carbon atoms are of particular interest, such as for example the compound of formula (6) 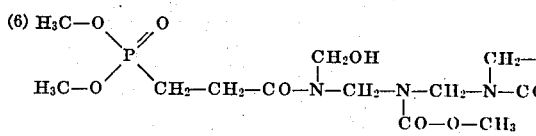 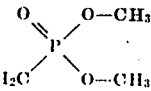

The phosphorus compounds of formulas (1) to (6) are appropriately manufactured by (a) reacting a condensation product of (a') 2 mols of at least one compound of formula (7) 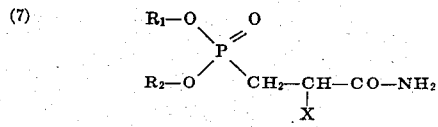

wherein $R_1$, $R_2$ and X have the indicated significance and (b') 1 mol of a carbamate of formula $$A — O — CO — NH_2$$

wherein A has the indicated significance, and wherein the $H_2N$ group of component (a') is monomethylolated or the $H_2N$ group of component (b') is dimethylolated and optionally etherified, with (b) 2 mols of formaldehyde or of a formaldehyde-releasing agent, at elevated temperature, optionally in the presence of a basic catalyst, and (c) optionally subsequently still etherifying with 1 to 2 mols of an alkanol with at most four carbon atoms.

The preferred procedure is that (a)(a') 2 mols of a compound of formula (7) are methylolated with 2 mols of formaldehyde or of a formaldehyde-releasing agent, subsequently (b') reacted with 1 mol of a carbamate of formula (8) in the absence of water, in an inert solvent, at elevated temperature, the resulting product thereafter (b) methylolated with 2 mols of formaldehyde or of a formaldehyde-releasing agent and subsequently optionally still (c) etherified with 1 to 2 mols of an alkanol with at most four carbon atoms.

The methylol compound of component (a') can optionally also be reacted with component (b) in the presence of an acid catalyst such as for example sulphuric acid, phosphoric acid or preferably p-toluenesulphonic acid.

The reaction with the carbamate is appropriately carried out at temperatures of 60° to 150°C.

The methylolations with formaldehyde or with a formaldehyde-releasing agent are carried out according to known methods, preferably in the presence of a basic catalyst such as for example magnesium oxide, sodium hydroxide, potassium hydroxide or sodium ethoxide, and at temperatures of 60° to 120°C. Preferably, anhydrous formaldehyde, especially in the form of paraformaldehyde, is used at least for the methylolation of the primary $—CO—NH_2$ groups.

In order to manufacture the compounds of formulas (1) to (6), phosphonocarboxylic acid amides of formula (9) 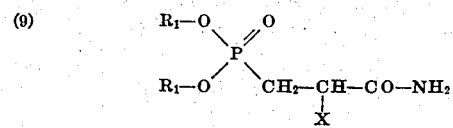

wherein $R_1$ and X have the indicated significance are preferably used.

Phosphonocarboxylic acid amides of formula

(10) 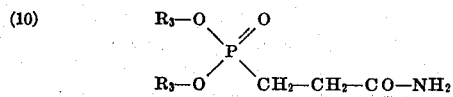

wherein $R_3$ denotes a methyl or ethyl residue are of particular interest.

Particularly suitable compounds of formula (1) are obtained by the use of 3-(dimethylphosphono)-propionic acid amide as component a).

Other compounds of formula (9) are for example 3-(dialkyl-phosphono)-propionic acid amide, 3-(bis-2-chlorethylphos-phono)-propionic acid amide, 3-(di-n-butylphosphono)-propionic acid amide, 3-(diethylphosphono)-propionic acid amide or 3-(dimethylphosphono)-2-methyl-propionic acid amide.

Particularly suitable carbamates for the manufacture of the phosphorus compounds of formulas (1) to (6) correspond to the formula $$A_1—O—CO—NH_2$$

or especially the formula $$A_2 — O — CO — NH_2$$

wherein $A_1$ and $A_2$ have the indicated significance.

Carbamates of formula $$A_2 — O — CO — NH_2$$

wherein $A_2$ denotes an alkyl residue with one to four carbon atoms, such as for example methylcarbamate, demand particular interest.

Other suitable carbamates are for example hydroxyethylcarbamate, 2,3-dibromopropylcarbamate, stearylcarbamate or alkylcarbamate.

If one still wishes to etherify the reaction product of components (a), (b) and (c), then this is preferably done with methanol.

Another process for the manufacture of the phosphorus compounds of formulas (1) to (6) consists of first dimethylolating 1 mol of a carbamate of formula (8) with 2 mols of formaldehyde or a formaldehyde-releasing agent, subsequently reacting the product with 2 mols of a phosphonocarboxylic acid amide of formula (7) in the absence of water, in an inert solvent, at elevated temperature, again methylolating with 2 mols of formaldehyde or a formaldehyde-releasing agent, and subsequently optionally still etherifying with 1 to 2 mols of an alkanol with at most four carbon atoms, preferably methanol.

Schematically, the two reaction routes can for example be represented as follows:

Route 1:

(a) (a')    $—CO—NH_2 + CH_2O \quad | \quad CH_2O + H_2N—CO \ldots$

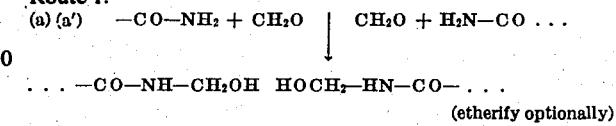

(etherify optionally)

(b') 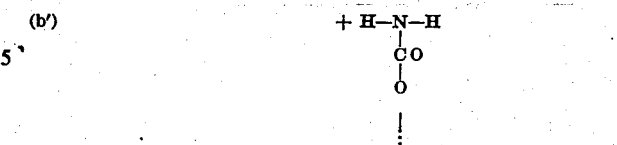

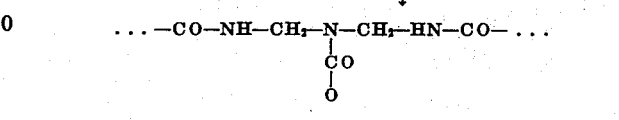

(b) 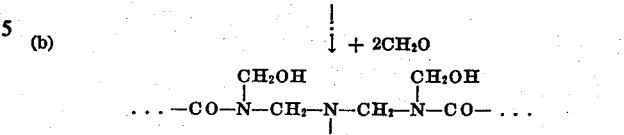

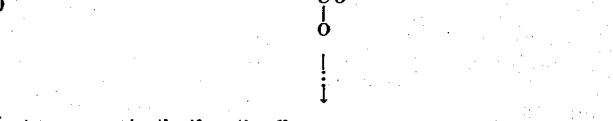

(c)    + etherify optionally (a) (b') 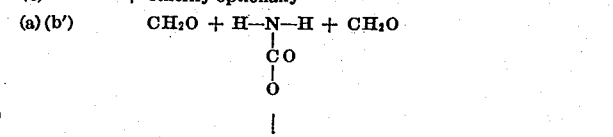

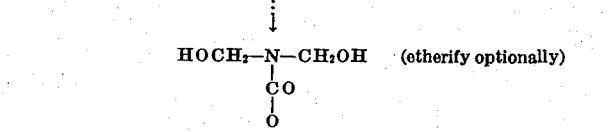 (etherify optionally)

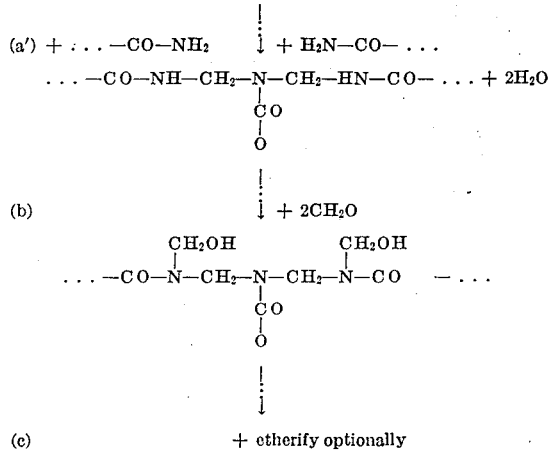

(c)                               + etherify optionally

The invention also relates to a process for the flame-proofing and creaseproofing of cellulose-containing fiber materials, characterized in that an aqueous preparation is applied to these materials which contains at least one phosphorus compound of one of formulas (1) and (6) and optionally a curable aminoplastic precondensate, and that the materials are thereafter dried and subjected to a treatment at elevated temperature.

In particular, phosphorus compounds of formula (2) are used for the flameproofing and creaseproofing of cellulose-containing textile material. Phosphorus compounds of formulas (3) to (5) are preferred, and the process for flameproofing and creaseproofing is of very particular interest if the compound of formula (6) is used.

The pH-value of the aqueous preparations containing the compounds of formula (1) is advantageously less than 5, in particular less than 3. In order to achieve this, mineral acids such as sulphuric acid, nitric acid, orthophosphoric acid or hydrochloric acid are added to the preparations. Instead of the acids themselves, especially instead of hydrochloric acid, it is also possible to use compounds from which the corresponding acids are easily formed in water by hydrolysis, for example even without warming. As examples, there may here be mentioned phosphorus trichloride, phosphorus pentachloride, phosphorus oxychloride, thionyl chloride, sulphuryl chloride, cyanuryl chloride, acetyl chloride and chloracetyl chloride. These compounds exclusively yield acid decomposition products, for example cyanuric acid and hydrochloric acid, on hydrolysis. Now it can be advantageous to employ, instead of one of the strong acids mentioned, the acid mixtures corresponding to the hydrolysis products of one of the compounds just mentioned, that is to say for example to employ, instead of hydrochloric acid or orthophosphoric acid alone, a mixture corresponding to phosphorus pentachloride of hydrochloric acid and orthophosphoric acid, appropriately in a molecular ratio of 5:1.

The preparations for flameproofing can also contain a latent acid catalyst for accelerating the cure of the aminoplast precondensate which is optionally present and for crosslinking the compounds of formula (1). As latent acid catalysts it is possible to use the catalysts known for curing aminoplasts on cellulose-containing material, for example ammonium dihydrogen orthophosphate, magnesium chloride, zinc nitrate, and especially ammonium chloride and others.

Apart from the compounds of formula (1) and the additives required for adjusting the pH-value, the preparations to be used according to the invention can contain yet further substances. An addition of aminoplast precondensates is advantageous, but not necessary, for achieving a good wash-resistant flameproof finish.

By aminoplast precondensates, addition products of formaldehyde to nitrogen compounds which can be methylolated are understood. 1,3,5-Amino-triazines such as N-substituted melamines, for example N-butylmelamine, N-trihalogenomethyl melamines, as well as ammeline, guanamines, for example benzoguanamine, acetoguanamine or also diguanamine, may be mentioned. Further possibilities are also: alkylureas or arylureas and alkylthioureas or arylthioureas, alkyleneureas or alkylenediureas, for example ethyleneurea, propyleneurea, acetylenediurea or especially 4,5-dihydroxyimidazolidone-2 and derivatives thereof, for example the 4,5-dihydroxyimidazolidone-2 which is substituted in the 4-position at the hydroxyl group by the residue — $CH_2CH_2CO-NH-CH_2OH$. Preferably, the methylol compounds of a urea, of an ethyleneurea or especially of melamine are used. Particularly valuable products are in general furnished by products which are as highly methylolated as possible. Suitable aminoplast precondensates are both predominantly monomolecular and also more highly precondensed aminoplasts.

The ethers of these aminoplast precondensates can also be conjointly used with the compounds of formula (3). The ethers of alkanols such as methanol, ethanol, n-propanol, isopropanol, n-butanol or pentanols are for example advantageous. It is however desirable for these aminoplast precondensates to be water-soluble, such as for example the pentamethylolmelamine-dimethyl-ether.

It can also be advantageous if the preparations contain a copolymer, obtainable by polymerization in aqueous emulsion, of (a) 0.25 to 10 percent of an alkaline earth metal salt of an $\alpha,\beta$-ethylenically unsaturated monocarboxylic acid, (b) 0.25 to 30 percent of an N-methylolamide or N-methylolamide-ether of an $\alpha,\beta$-ethylenically unsaturated monocarboxylic or dicarboxylic acid and (c) 99.5 to 60 percent of at least one other copolymerizable compound. These copolymers and their manufacture are also known. The tear strength and abrasion resistance of the treated fiber material can be favorably influenced by the conjoint use of such a copolymer.

As a further additive which is advantageous in some cases, a plasticizing dressing, for example and aqueous polyethylene emulsion or ethylene copolymer emulsion, should be mentioned.

The content of compound of formula (1) in the aqueous preparation is appropriately such that 10 to 28 percent are applied to the material to be treated. Here it is necessary to take into account that the commercial textile materials of native or regenerated cellulose can absorb between 50 and 120 percent of an aqueous preparation. As a rule the aqueous preparations contain 100 to 700 g/l, preferably 300 to 500 g/l, of phosphorus compound of formula (1).

The amount of the additive required to adjust the hydrogen ion concentration to a value of less than 5 is dependent on the selected value itself and on the nature of the additive, whilst in any case less than a certain minimum cannot be used. A certain excess over this minimum amount is generally to be recommended. Large excesses offer no advantages and can even prove harmful.

If a polymer of the indicated nature is further added to the preparation, then this is advantageously done in small amounts, for example 1 to 10 percent relative to the amount of the compound of formula (1). The same is true of a plasticizer which may be used, where the appropriate amounts can again be 1 to 10 percent.

The preparations are now applied to the cellulose-containing fiber materials, for example linen, cotton, acetate rayon, viscose rayon or also fiber mixtures of such materials and others such as wool, polyamide or polyester fibers, and this can be carried out in a manner which is in itself known. Particularly good effects are achieved on cotton. Preferably, piece goods are used and these are impregnated on a padder of the usual construction which is fed with the preparation at room temperature.

The fiber material impregnated in this way must now be dried and this is appropriately done at temperatures of up to 100°C. Thereafter it is subjected to a dry heat treatment at temperatures above 100°C, for example between 130° and 200°C, and preferably between 140° and 170°C, the duration of which can be the shorter, the higher is the temperature.

This duration of warming is for example 2 to 6 minutes at temperatures of 140° to 170°C.

A rinse with an acid-binding agent, preferably with aqueous sodium carbonate solution, for example at 40°C to the boiling point and for 3 to 10 minutes, is advisable in the case of a strongly acid reaction medium.

As already indicated, it is possible, using the present process, to obtain flameproof and creaseproof finishes which remain largely preserved even after repeated washing or dry cleaning and which do not cause any unacceptable reduction in the mechanical textile properties of the treated material.

A particular advantage of the present process is the fact that the treated cellulose-containing fiber materials are simultaneously flameproof and creaseproof, even without the conjoint use of aminoplastic precondensates. To the extent that the alkyl residue A of the compound of formula (1) is a long chain (for example behenyl or stearyl), a water-repellent effect can simultaneously also be achieved.

In particular, the wet creasing properties of the treated materials are significantly improved alongside the flameproof finish. A distinct improvement in the dry creasing angle can also be observed.

The percentages and parts in the examples which follow are units by weight unless otherwise stated. The relationship of parts by volume to parts by weight is as of ml to g.

EXAMPLE 1

220 parts ($\approx$1 mol) of 96 percent strength 3[-dimethylphosphono]-methylolpropionamide manufactured by methylolation of 3-(di-methylphosphono)propionanide, and 37.5 parts (0.5 mol) of methylcarbamate are brought to the boil under reflux, in the presence of 1.2 parts of p-toluenesulphonic acid and 200 parts of benzene, in a 500 parts by volume stirred flask equipped with a water separator and a thermometer, whilst stirring rapidly. Over the course of 12 hours 20 parts of water of condensation are formed in this way and collected in the water separator. After this time no further water is formed. The benzene is distilled off and thereafter 30.7 parts ($\approx$1 mol) of paraformaldehyde (97.5 percent strength) and 2 parts of magnesium oxide are added at 50°C. Hereafter the mixture is heated to 100°C and kept at this temperature of 30 minutes, after which it is cooled to room temperature. It is then diluted with 250 parts of methanol, the solution is clarified by filtration and the methanol is removed in vacuo.

230 parts of the product of formula (6) are obtained in the form of a colorless syrup which gives a clear solution in water and reacts neutral.

A 20 percent strength aqueous solution is prepared from this product and extracted with chloroform in the extraction apparatus. The chloroform phase is isolated and freed of chloroform in vacuo. A 20 percent aqueous solution is again prepared from the residue and extracted with carbon tetrachloride in the extraction apparatus. Here the aqueous phase is now isolated, freed of water in vacuo and dried for 24 hours over $P_2O_5$. The resulting syrupy product is checked for purity by means of thin layer chromatography and apart from trace contaminations gives a single substance chromatogram.

The structure of formula (6) can be confirmed by elementary analysis, mass spectroscopy and infrared spectroscopy.

The compounds of Examples 2 to 9 can also be purified and identified in an analogous manner.

EXAMPLE 2

211 parts (1 mol) of 3-dimethylphosphono)-methylolpropionic acid amide (obtained by methylolation of 3-(dimethylphos-phono)-propionamide) together with 52.5 parts (0.5 mol) of hydroxyethylcarbamate and 1.2 parts of p-toluenesulphonic acid monohydrate are suspended in 200 parts of toluene in a stirred flask of 500 volume units capacity, equipped with a thermometer, water separator and reflux condenser, and condensed at the reflux temperature of the toluene. The water formed is removed azeotropically and collected in the water separator. After 5 hours the reaction has ended and 19 parts of water are obtained. Thereafter the mixture is cooled to 100°C, 30.7 parts of 97.5 percent strength paraformaldehyde and 2 parts of magnesium oxide are added and the whole is treated for a further 30 minutes at 100°C. It is then cooled to room temperature, diluted with 240 parts of methanol, traces of insoluble constituents are filtered off, and subsequently the methanol is removed in vacuo at 40° to 50°C. 266 parts of a yellowish syrupy product are obtained which shows an active substance content of 100 percent and which, on the basis of the formaldehyde content found, largely corresponds to the dimethylol compound of formula (14). The product is water-soluble.

(14)

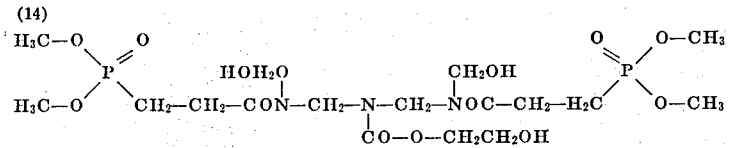

EXAMPLE 3

70.3 parts (0.33 mol) of 3-(dimethylphosphono)-methylolpropionic acid amide (obtained by methylolation of 3-(dimethyl-phosphono)-propionic acid amide) together with 43.5 parts (0.166 mol) of 2,3-dibromopropylcarbamate and 0.5 part of p-toluenesulphonic acid monohydrate are suspended in 200 parts of benzene in the apparatus described in Example 2 and are condensed at the reflux temperature of the benzene. After 6 hours the reaction has ended and 5 parts of water were obtained. Thereafter the mixture is cooled to 60°C, 10.3 parts of paraformaldehyde (97.5 percent strength) and 0.7 part of magnesium oxide are added, and the whole is treated for 30 minutes at 100°C internal temperature. It is then cooled to room temperature, being further diluted with 50 parts of water at 80°C, and clarified by filtration, and subsequently the water and benzene are removed in vacuo at 40° to 50°C.

A viscous paste is obtained which is water-soluble and is adjusted to 80 percent active substance content with water. On the basis of the formaldehyde content found it can be assumed that a product of formula (15) is present to the extent of about 80 percent.

(15)

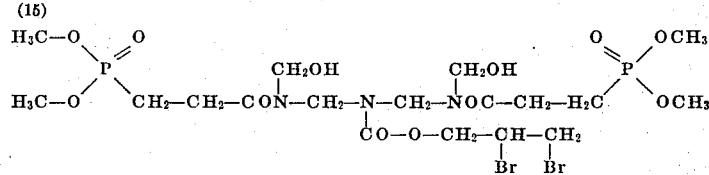

EXAMPLE 4

263 parts (1 mol) of 3(dialkylphosphono)-methylolpropionic acid amide (obtained by methylolation of 3-(dialkylphosphono)- propionic acid amide) together with 37.5 parts (0.5 mol) of methylcarbamate and 1.2 parts of p-toluenesulphonic acid monohydrate are suspended in 200 parts of toluene in the apparatus described in Example 2, and condensed at the reflux temperature of the toluene. After 15 hours the reaction has ended and 18 parts of water are obtained. Thereafter the mixture is cooled to 100°C, 30.7 parts of paraformaldehyde (97.5 percent strength) and 2 parts of magnesium oxide are added, and the whole is treated for a further 30 minutes at 100°C. The toluene is thereafter removed in vacuo. 233 parts of a syrupy product which on the basis of the formaldehyde content found corresponds practically quantitatively to formula (16) are obtained. The product is insoluble in water. The active substance content is about 100 percent.

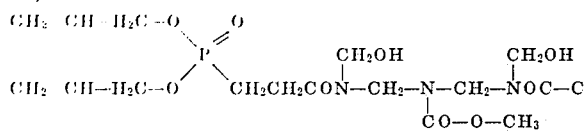

If instead of 3-(dialkylphosphono)-methylolpropionic acid amide, 3-(dimethylphosphono)-methylolpropionic acid amide is sued and instead of methylcarbamate, stearylcarbamate is used, in the same molar amounts, a product which corresponds to the formula (17) is obtained in an analogous manner.

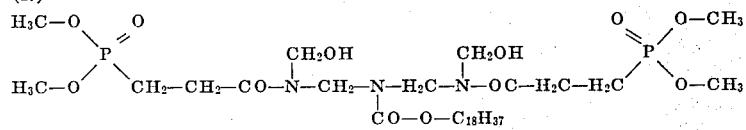

EXAMPLE 5

An analogous procedure to Example 4 is followed in the apparatus described in Example 2, with the exception that 308 parts (1 mol) of 3-(bis-2-chlorethylphosphono)-methylolpropionic acid amide (obtained by methylolation of 3-(bis-2-chlorethylphosphono)-propionic acid amide) are used instead of the diallyl compound. After 1½ hours the reaction has ended and 16 parts of water are obtained. Thereafter the mixture is cooled to 100°C, 30.7 parts of paraformaldehyde (97.5 percent strength) and 2 parts of magnesium oxide are added, and the whole is treated for a further 30 minutes at 100°C. It is then cooled to room temperature, diluted with 240 parts of methanol, insoluble constituents are filtered off, and the methanol and toluene are subsequently removed in vacuo at 40° to 50°C. 350 parts of a yellowish syrupy product are obtained. Apart from this, 10 parts of unreacted paraformaldehyde are recovered.

On the basis of the formaldehyde content found it can be assumed that the compound of formula (18) is present to the extent of about 65 percent. The product is insoluble in water. The active substance content is about 100 percent.

EXAMPLE 6

An analogous procedure to Example 4 is followed in the apparatus described in Example 2, with the exception that 225 parts (1 mol) of 3-[dimethylphosphono]-2-methyl-methylolpropionic acid amide (obtained by methylolation of 3-[dimethyl-phosphono]-2-methyl-propionic acid amide) are used instead of the dialkyl compound. After 4 hours the reaction has ended and 17.5 parts of water have been obtained. The reaction with paraformaldehyde is carried out analogously, but after cooling the mixture is diluted with 250 parts of dimethylformamide, traces of insoluble constituents

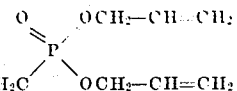

are filtered off, and the dimethylformamide and toluene removed in vacuo.

A highly viscous brownish-colored product is obtained which shows an active substance content of about 100 percent. The product is insoluble in water and, on the basis of the formaldehyde values found, corresponds to the formula (19).

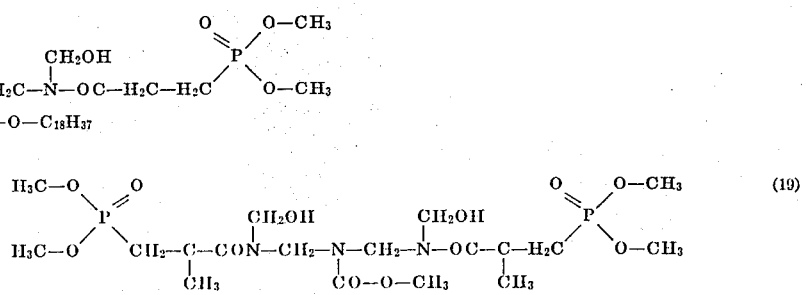

EXAMPLE 7

200 parts of 3-(di-n-butylphosphono)-propionic acid methylolamide (obtained by methylolation of 3(di-n-butylphosphono)propionic acid amide) together with 28.2 parts of methylcarbamate and 1 parts of p-toluenesulphonic acid monohydrate are suspended in 200 parts of xylene in the apparatus described in Example 2, and condensed at the reflux temperature of the xylene. After 6 hours the reaction has ended and 12.5 parts of water have been obtained. Thereafter the xylene is distilled off in vacuo and subsequently 23.1 parts of 97.5 percent strength paraformaldehyde and 1.5 parts of magnesium oxide are added. Hereafter the mixture is treated for 30 minutes at 100°C, after which it is cooled and diluted with 240 parts of methanol. Traces of insoluble constituents are filtered off from the solution and the methanol and xylene are removed in vacuo. 230 parts of a slightly yellowish syrupy product are obtained which on the basis of the formaldehyde content found corresponds to the formula (20). The active substance content is about 100 percent. The product is insoluble in water.

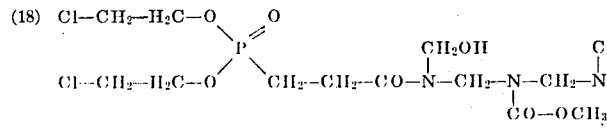

EXAMPLE 8

129.5 parts of 3-[dimethylphosphono]-methylolpropionic acid amide (obtained by methylolation of 3-(dimethylphosphono)-propionic acid amide) together with 31 parts of allylcarbamate and 1 parts of p-toluenesulphonic acid monohydrate are suspended in 200 parts of toluene in the apparatus described in Example 2 and condensed at the reflux temperature of the toluene. After 16 hours the reaction has ended and 11.5 parts of water have been obtained. Thereafter the mixture is cooled to 100°C, 18.7 parts of paraformaldehyde (97.5 percent strength) and 1 part of sodium methylate powder 100 percent strength) are added, and the whole is treated for a further 30 minutes at 100°C. It is then cooled to room temperature, diluted with 240 parts of methanol, traces of insoluble constituents are filtered off, and the methanol and toluene are subsequently removed in vacuo at 40° to 50°C.

150 parts of a yellow highly viscous product are obtained which shows an active substance content of about 100 percent and which, on the basis of the formaldehyde content found, corresponds to the formula (21). The product is water-soluble.

(21) 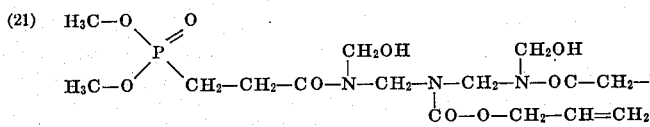

EXAMPLE 9

53.5 parts of dimethylol-methylcarbamate (obtained by methylolation of methylcarbamate), 71.6 parts of 3-[dimethylphosphono]e-propionic acid amide, 110 parts of 3[bis-2-chlorethylphosphono]-propionic acid amide and 1 part of p-toluenesulphonic acid monohydrate are suspended in 200 parts of toluene in the apparatus described in Example 2, and condensed at the reflux temperature of the toluene. After 2 hours the reaction has ended and 15 parts of water are obtained. Thereafter the mixture is cooled to room temperature and diluted with 240 parts of methanol. After filtering off traces of insoluble constituents, the methanol and toluene are removed in vacuo at 50°C. The viscous residue is again transferred into the apparatus described in Example 2, but the water separator is removed and replaced by an HCl gas inlet tube. 24.5 parts of paraformaldehyde (97.5 percent strength) and 1.5 parts of magnesium oxide are now added, and the mixture is heated to 100°C and treated at this temperature for 30 minutes. The formaldehyde determination of a sample shows that the corresponding free dimethylol compound of the ether of formula (20) has been formed to the extent of about 80 percent. The mixture is now cooled to 60°C, diluted with 160 parts of methanol and subsequently cooled to 25°C. Thereafter HCl gas is passed into the methanol solution until a pH of 2.3 to 2.5 is reached, after which the mixture is warmed to the reflux temperature of the methanol and etherification carried out for 1 hour. The pH is 2.3 to 2.5 during the entire etherification reaction. The mixture is now cooled to 60°C and neutralized to a pH value of 7.9 with anhydrous sodium carbonate, and then cooled to room temperature, clarified by filtration, and the methanol removed in vacuo at 40°C.

The resulting reaction product of formula (22) is a yellowish solid mass. Yield: 214 parts. The product is water-soluble.

(22) 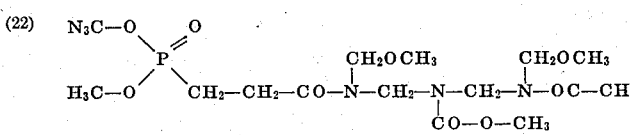

EXAMPLE 10

A cotton fabric is padded with one of the aqueous liquors A to D of the table below. The liquor uptake is 80 percent. The material is dried at 70° to 80°C and thereafter cured for 4½ minutes at 160°C. The woven fabric is now post-washed for 5 minutes at the boil in a solution which per liter of water contains 2 g of anhydrous sodium carbonate, rinsed and dried. A part of the woven fabric is boiled 5 times or 10 times, respectively, for 30 minutes in a solution which contains 2 g of sodium carbonate and 5 g of soap per liter of water (= SNV–4 wash).

The individual pieces of woven fabric are then tested for their flameproof and creaseproof behavior and handle. The results of this test are also summarized in the table below:

| Constituents | untreated | Treated with preparation | | | |
|---|---|---|---|---|---|
| | | A | B | C | D |
| Product according to ex. 1 g/l (100%) | | 322 | 375 | 425 | 372 |
| Pentamethylolmelamine-dimethyl-ether (60%) g/l | | 80 | 80 | – | – |
| NH₄Cl g/l | | 4 | 4 | 4 | 4 |
| pH of the preparation | | 5.6 | 5.4 | 5.8 | 5.9 |
| Flameproof property[1] | | | | | |
| After post-washing: | | | | | |
| Burning time (sec.) | burns | 0 | 0 | 0 | 0 |
| Glowing time (sec.) | – | 0 | 0 | 0 | 0 |
| Length of tear (cm) | – | 9.5 | 9.5 | 10 | 11.5 |
| + After 5 SNV–4 washes: | | | | | |
| Burning time (sec.) | burns | 0 | 0 | 0 | 0 |
| Glowing time (sec.) | – | 0 | 0 | 0 | 0 |
| Length of tear (cm) | – | 11 | 9.5 | 10 | 12 |
| + After 10 SNV–4 washes: | | | | | |
| Burning time (sec.) | burns | 0 | 0 | 0 | burns |
| Glowing time (sec.) | – | 0 | 0 | 0 | – |
| Length of tear (cm) | – | 10.5 | 10 | 11.5 | – |
| Crease Resistance | | | | | |
| – Creasing angle[2]  dry ∢(°) | 69 | 96 | 96 | 84 | 94 |
| wet ∢(°) | 57 | 118 | 114 | 104 | 100 |
| Handle[3] | 3 | 4 | 5 | 4 | 3 |

Explanations for Table
1 Vertical test according to DIN 53,906
2 Average of 10 measurements
3 Rating scale: 1 = soft
  8 = stiff In addition to a good, and in most cases durable, flameproofing, a good crease-free effect is thus also achieved with the preparations A to D, and in particular both with and without the addition of an aminoplast precondensate. Equally, the handle of the fabric finished in this way is only changed little or not at all compared to the handle of the untreated fabric.

EXAMPLE 11

A cotton fabric is padded with one of the aqueous liquors E and F of the table below. The liquor uptake is 84 percent. The goods are dried at 70° to 80°C and thereafter cured for 5 minutes at 145°C. The woven fabric is now post-washed for 5 minutes at the boil in a solution which per liter of water contains 2 g of anhydrous sodium carbonate, rinsed and dried.

The flameproof test according to DIN 53,906 shows that the woven fabric has good flameproof properties.

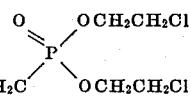

| Constituents | | Preparation | |
|---|---|---|---|
| | | E | F |
| Product according to Example 2 | g/l | 420 | 365 |
| Pentamethylolmelamine-dimethyl-ether (60%) | g/l | – | 80 |

| | | | |
|---|---|---|---|
| H₃PO₄ (85%) | g/l | 30 | 30 |
| Phosphorus | g/l | 47 | 41 |

EXAMPLE 12

50 parts of the 80% strength aqueous solution of the products according to Example 3, 5 parts of pentamethylolmelaminemethyl-ether and 0.25 part of NH₄Cl are diluted with water to 100 parts by volume of aqueous solution. A polyester-cotton mixed fabric (50:50 mixing ratio) is impregnated with this solution, dried at 80°C and cured for 4½ minutes at 160°C. The deposit on the fabric is 28.5 percent by weight. The flameproof test according to DIN 53,906 shows that the woven fabric has good flameproof properties.

EXAMPLE 13

A cotton fabric is padded with one of the aqueous liquors G to R of the table below. The liquor uptake is 84 percent. The goods are dried at 70° to 80°C and cured for 5 minutes at 145°C.

The flameproof test according to DIN 53,906 shows that the fabrics finished in this way have good flameproof properties.

| Constituents | Preparation, g./l. | | | | | | | | | | | |
|---|---|---|---|---|---|---|---|---|---|---|---|---|
| | G | H | I | J | K | L | M | N | O | P | Q | R |
| Preparation according to example: | | | | | | | | | | | | |
| 4 | 475 | | | | | | 475 | | | | | |
| 5 | | 540 | | | | | | 470 | | | | |
| 6 | | | 415 | | | | | | 360 | | | |
| 7 | | | | 520 | | | | | | 455 | | |
| 8 | | | | | 415 | | | | | | 360 | |
| 9 | | | | | | 470 | | | | | | 410 |
| Pentamethylolmelamine-dimethyl-ether (60%) | | | | | | | 80 | 80 | 80 | 80 | 80 | 80 |
| Condensation product of 1 mol of p-tert.-nonylphenol and 9 mols of ethylene oxide | 20 | 20 | 20 | 20 | | | 20 | 20 | 20 | 20 | | |
| H₃PO₄ (85%) | 30 | 30 | 30 | 30 | 30 | 30 | 30 | 30 | 30 | 30 | 30 | 30 |
| Phosphorus | 47 | 47 | 47 | 47 | 47 | 47 | 41 | 41 | 41 | 41 | 41 | 41 |

We claim:

1. A phosphorus compound of the formula

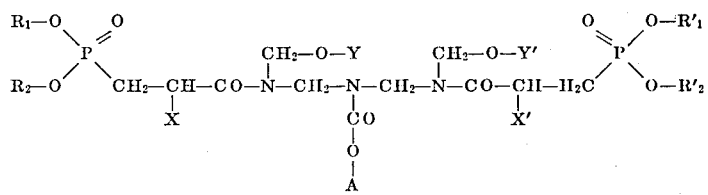

in which R₁, R₂, R₁' and R₂' each is an alkyl, alkenyl, chloro- or bromoalkyl radical with at most four carbon atoms, X and X' each is a methyl radical or a hydrogen atom, Y and Y' each is an alkyl radical with at most four carbon atoms or a hydrogen atom and A is an alkyl radical with at most 22 carbon atoms, a chloro- or bromoalkyl radical with at most four carbon atoms, a hydroxyalkyl radical with at most four carbon atoms, an alkenyl radical with two to 22 carbon atoms, a phenyl, a chloro- or bromo substituted phenyl, a benzyl or a chloro or bromo substituted benzyl radical.

2. A phosphorus compound according to claim 1 in which A is an alkyl radical with at most 22 carbon atoms, a chloro or bromoalkyl radical with at most four carbon atoms, an alkenyl radical with two to 22 carbon atoms, a phenyl, a chloro or bromo substituted phenyl, a benzyl or a chloro or bromo substituted benzyl radical.

3. A phosphorus compound according to claim 1 of the formula

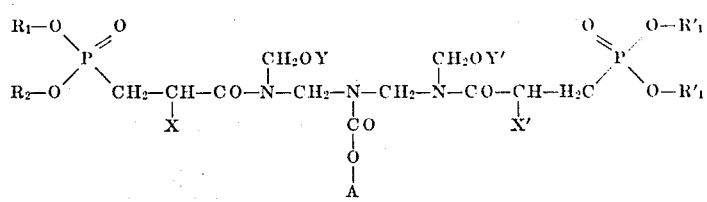

4. A phosphorus compound according to claim 1 of the formula

5. A phosphorus compound according to claim 4, in which R₁ is a methyl or ethyl radical, Y is a methyl radical or a hydrogen atom and A is an alkyl radical with at most 18 carbon atoms, a chloro- or bromoalkyl radical with at most three carbon atoms, a hydroxyalkyl radical with at most three carbon atoms or an alkenyl radical with two to four carbon atoms.

6. A phosphorus compound according to claim 5, in which A is an alkyl radical with at most four carbon atoms.

7. The phosphorus compound according to claim 1 of the formula

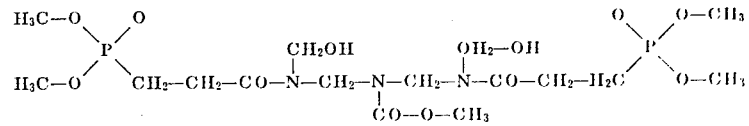

8. The phosphorus compound according to claim 1 of the formula

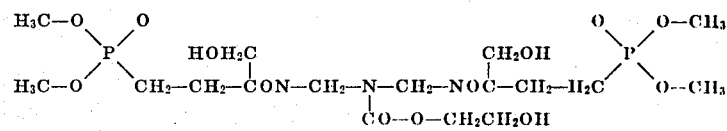

9. The phosphorus compound according to claim 1 of the formula

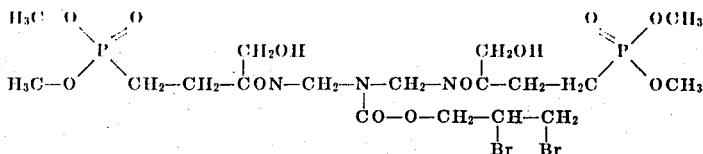

10. A process for the manufacture of a phosphorus compound as claimed in claim 1, which comprises reacting
a. a condensation product of
   a'. 2 mols of at least one compound of the formula

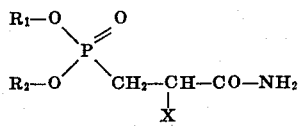

and
b'. 1 mol of a carbamate of the formula $$A-O-CO-NH_2$$

in which the $H_2N$-group of component (a') is monomethylolated or the $H_2N$ group of component (b') is dimethylolated, with
b. 2 mols of formaldehyde or a formaldehyde-releasing agent, at 60° to 150°C.

11. A process according to claim 10 wherein the reaction product is etherified with 1 to 2 mols of an alkanol with at most four carbon atoms.

* * * * *

PO-1050
(5/69)

UNITED STATES PATENT OFFICE
CERTIFICATE OF CORRECTION

Patent No. 3,679,778                    Dated July 25, 1972

Inventor(s) HERMAN NACHBUR ET AL

It is certified that error appears in the above-identified patent and that said Letters Patent are hereby corrected as shown below:

Column 14, claim 7, line 73, the claim should read as follows.

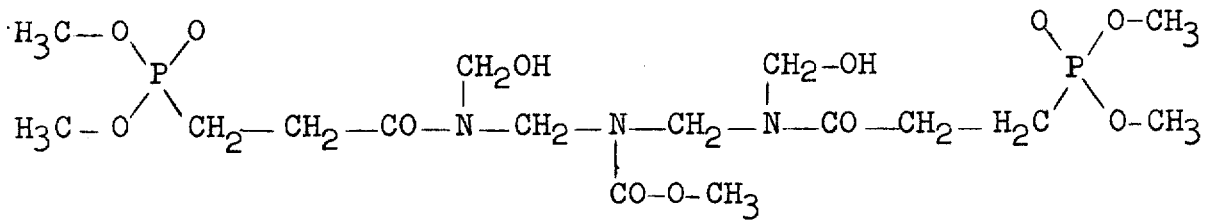

Signed and sealed this 2nd day of April 1974.

(SEAL)
Attest:

EDWARD M. FLETCHER, JR.
Attesting Officer

C. MARSHALL DANN
Commissioner of Patents